(No Model.)

W. A. ROOT.
BARBED WIRE.

No. 281,300. Patented July 17, 1883.

Witnesses:
Thos. H. Dodge
Geo. T. Pinckney

Inventor:
William A. Root

N. PETERS, Photo-Lithographer, Washington, D. C.

UNITED STATES PATENT OFFICE.

WILLIAM A. ROOT, OF NEW YORK, N. Y., ASSIGNOR TO WASHBURN & MOEN MANUFACTURING COMPANY, OF WORCESTER, MASSACHUSETTS, AND ISAAC L. ELLWOOD, OF DE KALB, ILLINOIS.

BARBED WIRE.

SPECIFICATION forming part of Letters Patent No. 281,300, dated July 17, 1883.

Application filed December 17, 1881. (No model.)

*To all whom it may concern:*

Be it known that I, WILLIAM A. ROOT, of New York city, in the county and State of New York, have invented certain new and useful Improvements in Barbed Wire; and I do hereby declare that the following is a full, clear, and exact description of the same, reference being had to the accompanying drawings, forming a part of this specification, and in which—

Figure 1:
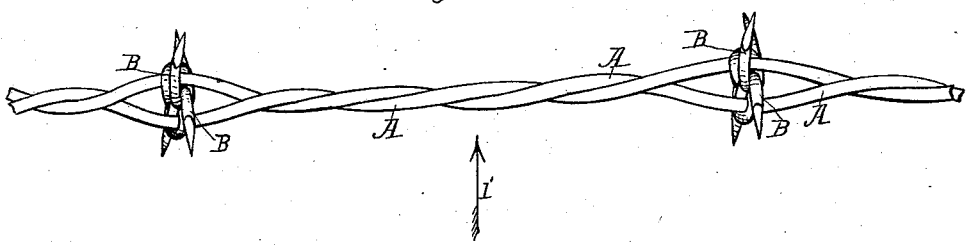
Figure 2:
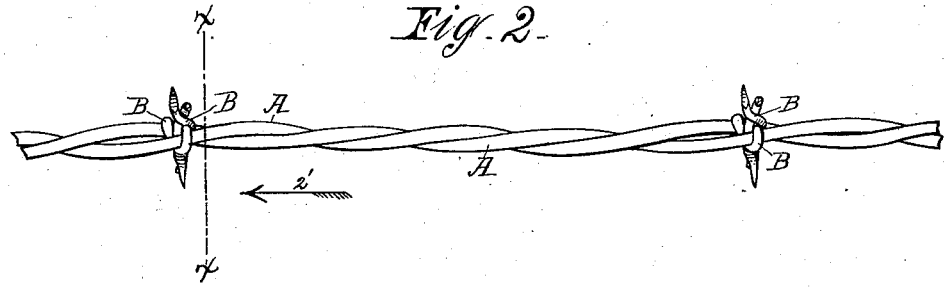
Figure 3:
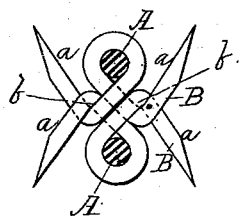

Figure 1 represents a section of my improved barbed wire. Fig. 2 represents the same parts shown in Fig. 1, looking in the direction of arrow 1', Fig. 1; and Fig. 3 represents a section on line $x\ x$, Fig. 2, looking in direction of the arrow 2' of the same figure.

To enable those skilled in the art to which my invention belongs to make and use the same, I will proceed to describe it more in detail.

In the drawings, the parts A A represent the main or longitudinal fence-wires, and the parts B B represent the barbed wires, and the opposite ends of these barbed wires B B are interlocked or twisted together with their ends bent out to form barbs $a\ a$, as shown, while the middle portions of such barbed wires are passed around and between the main wires, but from opposite sides thereof, thereby locking the main wires together and also securely fastening the barbed wires to such main wires.

By my present improvement it will be observed that the bodies of both barbed wires pass through between the main fence-wires A, but from opposite directions, and that the barbed wires not only serve to interlock and fasten each other to the main wires, but also serve the additional function of fastening the main wires together.

Having described my improvements in barbed wires, what I claim therein as new and of my invention, and desire to secure by Letters Patent, is—

The combination, with two main fence-wires, of two barb-wires, each of which is wrapped around one of the main fence-wires, with its ends crossing in the space between the main wires and projecting upon opposite sides of the cable, the respective ends of both barb-wires which project upon the same sides of the cable being thereafter twisted together and bent in opposite directions to form barbs, substantially as and for the purposes set forth.

WILLIAM A. ROOT.

Witnesses:
 GEO. T. PINCKNEY,
 THOS. H. DODGE.